Patented Dec. 24, 1940

2,225,695

UNITED STATES PATENT OFFICE 2,225,695

METHOD FOR INCREASING FLOW OF DEEP WELLS

Lawrence M. Henderson, Winnetka, George W. Ayers, Jr., Chicago, Warren A. Raine, Evanston, and William B. Ross, Winnetka, Ill., assignors to The Pure Oil Company, Chicago, Ill., a corporation of Ohio No Drawing. Application November 30, 1936, Serial No. 113,362

2 Claims. (Cl. 166—21)

This invention relates to the method of treating the deep wells, such as oil and gas wells, to cause increased production of fluid therefrom, and is more particularly concerned with the treatment of wells drilled in sandstone formations.

The treatment of wells drilled in calcareous formations with hydrochloric acid in order to increase the flow of oil therein is well-known and disclosed in the patent to Grebe et al., No. 1,877,504. However, hydrochloric acid is ineffectual in the treatment of sandstone formations since the hydrochloric acid will not dissolve silica.

It has been proposed to treat wells drilled in sandstone formation with hydrofluoric acid for the purpose of opening up the well formation and increasing the oil or other fluid flow but such attempts have not been successful. Instead of increasing the flow of fluid from the well the hydrofluoric acid in fact decreases the flow.

We have discovered that wells drilled in sandstone formations may be opened up and caused to flow at an increased rate by treating such wells with a combination of reagents, one of which will attack silica and another of which will dissolve the reaction products resulting from the action of the silica-dissolving reagent. Our preferred method is to treat the well first with the silica-dissolving reagent and then treat with the reagent which will dissolve the reaction products.

The reason for the failure of hydrofluoric acid to cause increase in flow of wells in sandstone formations may be explained as follows. The sandstone, in addition to the silica, contains alkaline earth metal compounds such as calcium silicate. When these alkaline earth metal compounds are brought into contact with hydrofluoric acid, fluorides and silico-fluorides are formed. Calcium fluoride, for example, is only slightly soluble in dilute hydrofluoric acid, and therefore this material deposits in the pores and passages of the rock formation thereby rendering it more impervious than before treatment. Furthermore, the silico-fluoride, silicic acid and hydrofluosilicic acid, as well as certain silicates may be formed as colloidal gels which may set to hard solid masses causing additional clogging of the pores and passages in the sandstone.

We have found that if the well is treated with hydrochloric acid subsequent to the hydrofluoric acid treatment, clogging of the rock formation surrounding the well bore does not take place and the well can be made to flow at a greatly increased rate. The effectiveness of the hydrochloric acid is due to the fact that, particularly when used in fairly concentrated solution, it will dissolve calcium and other insoluble fluorides and take up silicic acids and other gels, resulting from the treatment with the hydrofluoric acid, in colloidal solution and thereby remove these materials from the passages formed by the action of the hydrofluoric acid on this sandstone.

The object of our invention is to increase the flow of wells in sandstone formations.

Another object of our invention is to provide means of increasing flow of fluids in deep wells located in sandstone formations by means of treatment of such wells with chemical reagents.

Other objects of our invention will be apparent from the following detailed description.

In accordance with the invention a well which has ceased to flow or which is flowing at a reduced rate is treated by injecting into the well bore a suitable quantity of hydrofluoric acid. The quantity of acid used will depend upon the size of the well and upon the rate at which the well is flowing at the time of the treatment, but may vary from 50 or less to 100 or more barrels. The hydrofluoric acid may vary in concentration from 24% up to 60% or higher. Concentrations of less than approximately 24% are not found to be practical for the reason that the rate of reaction upon the well formation is too slow and for the further reason that the excess water causes undesirable dilution of the hydrochloric acid which is used as part of the process. The acid should preferably contain a small percentage of inhibitor such as arsenious or arsenic oxide, in amounts of about 0.2 to 0.5 of 1% in order to inhibit the action of the acid in the well tubing and casing. Other inhibitors such as cyanides, organic nitrogen bases such as aniline, phenylhydrazine, pyridine, quinoline, acridine and organic sulphur compounds such as mercaptans may be substituted as the inhibitor for the arsenious or arsenic oxide.

Both the hydrofluoric and the hydrochloric acids may be applied to the well in the same manner as disclosed in the patent to Carr, No. 1,891,-667, or in the patent to Carr et al., No. 2,018,199.

In our preferred method the hydrochloric acid is not supplied to the well until the hydrofluoric acid has had sufficient time to react. The period between the hydrofluoric acid and the hydrochloric acid may range from a few hours to several days, depending largely upon the quantity of hydrofluoric acid injected into the well.

The hydrochloric acid should have a concentration in excess of 10% acid and preferably the concentration should be about 35% acid. Although the less concentrated acid is more effective in keeping the colloidal gels in the solution, it is important that the hydrochloric acid be sufficiently concentrated to dissolve calcium and other fluorides. The hydrochloric acid may be introduced in various quantities, depending upon the particular formation and the quantity of hydrofluoric acid used. For example, where the quantity of hydrofluoric acid applied to the well varies from 50 to 100 barrels the quantity of hydrochloric acid may vary from 25 to 50 barrels (50 gallons per barrel).

Instead of hydrochloric acid other acids may be used which are capable of dissolving insoluble compounds formed by the action of hydrofluoric acid on the well formation and capable of taking into colloidal solution or suspension the reaction products. Either organic or inorganic acid may be used, such as acetic or nitric acid. Any acids which are corrosive to the well tubing and casing should be preferably inhibited by addition of inhibitors such as disclosed in connection with the hydrofluoric acid. If nitric acid is used, inorganic inhibitors are preferable since organic inhibitors are attacked by the acid.

The treatment with hydrofluoric and hydrochloric or other acid may be repeated one or more times at spaced intervals in order to further increase the well flow.

In order to illustrate increased porosity of sandstone after treatment with hydrofluoric and hydrochloric acid a piece of sandstone was sealed in a lead tubing coated with wax and distilled water was forced through the tube under a pressure of 20 pounds per square inch. Hydrofluoric acid was then forced through the sandstone under the same pressure and then water again forced through in order to determine if the porosity of the sandstone had been increased as would be demonstrated if the water could be forced through the sandstone at a greater rate than the initial rate. Hydrochloric acid was then forced through the sandstone and after the hydrochloric acid treatment water again forced through in order to determine the rate at which the water would pass through the sandstone after hydrochloric acid was added. The results on two different sandstone discs are tabulated below:

*Table I*

|  | Rate in cubic centimeters per minute under 20 pounds per square inch pressure ||
|---|---|---|
|  | Stone 1 | Stone 2 |
| Initial rate of distilled water | 15 | 6 |
| Rate of 48% hydrofluoric acid: |  |  |
| 138 cc | 11 |  |
| 100 cc |  | 20 |
| Rate of 2d 48% hydrofluoric acid treatment: 100 cc | 6 |  |
| Water rate after hydrofluoric acid treatment: |  |  |
| First 100 cc | 47 | 21 |
| Second 100 cc | 2 | 14 |
| Third 100 cc | 1 | 9 |
| Fourth 100 cc | 0.5 | 3 |
| Fifth 100 cc |  | Less than 1 |
| Rate of 35% hydrochloric acid through sandstone treated with hydrofluoric acid: 100 cc | 9 | Rapid |
| Water rate after hydrochloric acid treatment: |  |  |
| First 100 cc | 30 | 54 |
| Second 100 cc | 27 | 53 |
| Third 100 cc | 61 | 50 |
| Fourth 100 cc | 43 | 49 |
| Fifth 100 cc |  | 49 |
| Sixth 100 cc |  | 45 |

In the table given above on the first stone after the first water treatment the stone stood over night and was not given second treatment until the next day. The low permeability of the stone to water in this instance was probably due to the fact that the gels formed by hydrofluoric acid treatment had time to set over night and close the passageways.

A test similar to that given in Table I was performed on a third sample of sandstone obtained from a producing formation, but in this case the sandstone was first impregnated with an aqueous solution of calcium chloride and then treated with hydrofluoric and hydrochloric acids. The results show the effect of calcium salts in the sandstone formation insofar as the effectiveness of hydrofluoric and hydrochloric acids in increasing porosity thereof is concerned.

*Table No. II*

|  | Rate of flow of cubic centimeters per minute under 20 pounds per square inch pressure |
|---|---|
| Initial rate of distilled water to sandstone disc: |  |
| First 100 cc | 0.7 |
| Second 100 cc | 0.8 |
| Rate of 10% calcium chloride solution through disc: |  |
| 100 cc | 0.7 |
| Rate of 48% hydrofluoric acid through disc impregnated with calcium chloride solution: |  |
| 100 cc | 6 |
| Water rate after hydrofluoric acid treatment: |  |
| First 100 cc | 89 |
| Second 100 cc | 77 |
| Third 100 cc | 40 |
| Fourth 100 cc | 17 |
| Fifth 100 cc | 4 |
| Rate of 35% hydrochloric acid through disc following hydrofluoric acid treatment: |  |
| 100 cc | 50 |
| Water rate after hydrochloric acid treatment: |  |
| First 100 cc | 194 |
| Second 100 cc | 140 |
| Third 100 cc | 140 |
| Fourth 100 cc | 136 |
| Fifth 100 cc | 140 |

It is evident from the results tabulated in Tables I and II that although the permeability of the sandstone disc after the hydrofluoric acid was initially high, permeability dropped off rapidly until it was reduced to practically zero, whereas after the hydrochloric acid treatment permeability was generally higher than it was after the hydrofluoric acid treatment and the permeability was maintained fairly constantly.

Although it is believed that the reduced porosity of the sandstone after hydrofluoric acid treatment is caused by the clogging of the passageways by insoluble compounds and colloids formed as a result of the hydrofluoric treatment, and that the increased porosity after the hydrochloric acid treatment is due to the solution of these insoluble compounds whether in true or colloidal solution by hydrochloric acid, we do not want to be limited to any particular theory for explaining the novel result obtained. Regardless of the theory or mechanism of the reaction which takes place, the treatment of wells bored in sandstone formations with hydrofluoric and hydrochloric or other acid capable of dissolving insoluble compounds and colloids formed by the hydrofluoric acid treatment, does produce the desired result of increasing the flow of fluid from such wells. By our method it is possible to recover much larger quantities of oil and other fluid from sandstone formation than has been possible heretofore.

We claim as our invention:

1. The method of treating deep wells in siliceous formations in order to increase the production of gas or oil therefrom which comprises injecting into such wells inhibited hydrofluoric acid containing from 24 to 60% of hydrofluoric acid by weight, allowing sufficient time for the acid to substantially completely react with the producing formation and then injecting into the well a sufficient quantity of reagent capable of dissolving gelatinous reaction products formed during the reaction between the producing formation and the hydrofluoric acid.

2. Method in accordance with claim 1 in which the reagent introduced into the well after completion of the hydrofluoric acid reaction is hydrochloric acid having a concentration of 10 to 35% by weight.

LAWRENCE M. HENDERSON.
GEORGE W. AYERS, JR.
WARREN A. RAINE.
WILLIAM B. ROSS.